(12) United States Patent
Ohkubo

(10) Patent No.: US 7,668,070 B2
(45) Date of Patent: Feb. 23, 2010

(54) OPTICAL RECORDING MEDIUM HAVING A PLURALITY OF RECORDING LAYERS

(75) Inventor: Shuichi Ohkubo, Tokyo (JP)

(73) Assignee: NEC Corporation, Tokyo (JP)

( * ) Notice: Subject to any disclaimer, the term of this patent is extended or adjusted under 35 U.S.C. 154(b) by 443 days.

(21) Appl. No.: 11/511,377

(22) Filed: Aug. 29, 2006

(65) Prior Publication Data
US 2007/0047430 A1   Mar. 1, 2007

(30) Foreign Application Priority Data
Aug. 30, 2005   (JP) .............................. 2005-248536

(51) Int. Cl.
*G11B 7/24* (2006.01)
(52) U.S. Cl. ............................... 369/275.1; 430/270.13
(58) Field of Classification Search .............. 369/275.1, 369/275.2, 275.3, 275.4, 283
See application file for complete search history.

(56) References Cited

U.S. PATENT DOCUMENTS

2004/0202097 A1* 10/2004 Oyake et al. ................ 369/283
2004/0252622 A1* 12/2004 Kariyada .................. 369/275.2
2005/0180303 A1*  8/2005 Shingai et al. ........... 369/275.2

FOREIGN PATENT DOCUMENTS

| JP | 2002-025115 A | 1/2002 |
| JP | 2003-317314 A | 11/2003 |
| JP | 2004-310992 A | 11/2004 |

OTHER PUBLICATIONS

New Handbook of Optical Technology, Sep. 20, 2002, p. 525-527, Asakura Publishing Co., Ltd.

* cited by examiner

*Primary Examiner*—Tan X Dinh
*Assistant Examiner*—Andrew J Sasinowski
(74) *Attorney, Agent, or Firm*—Sughrue Mion, PLLC

(57) ABSTRACT

A phase-change disk has first and second disk sections each including a recording layer and a reflective layer. The first disk section includes a transmission-factor control film including first through third dielectric layers having refractive indexes of n1, n2 and n3, where n1>n2<n3, for improving the transmission factor of the first disk section, which increases the optical intensity of the reflected light from the second disk section.

9 Claims, 3 Drawing Sheets

OPTICAL RECORDING MEDIUM HAVING A PLURALITY OF RECORDING LAYERS

BACKGROUND OF THE INVENTION (a) Field of the Invention

The present invention relates to an optical recording medium having a plurality of recording layers and, more particularly, to an optical recording medium having a plurality of recording layers consecutively arranged from a light-incident side of the optical recording medium.

(b) Description of the Related Art

Optical recording media include a phase-change optical recording disk (phase-change disk), wherein irradiation of a laser beam forms and erases a recorded mark on a recording layer in a reversible way to change the optical property of the recording layer between the recorded state and the erased state. Upon reproducing data recorded in the phase-change disk, a reproducing laser beam is irradiated onto the disk and the reflected laser beam is examined to detect the optical intensity or phase thereof for judging the data.

A multiple-recording-layer phase-change disk is known which includes a plurality of recording layers layered one on another for increasing the recording capacity. Data are recorded and reproduced to/from the multiple-recording-layer phase-change disk by irradiating a laser beam through one of the surfaces of the phase-change disk. A two-recording-layer phase-change disk, for example, theoretically has a recording capacity substantially double the recording capacity of a single-layer phase-change disk.

FIG. 4 shows a layered structure of a conventional two-recording-layer phase-change disk 50, which includes, consecutively from the light-incident side, a first disk section 51, an optical separation layer 52 and a second disk section 53. The first disk section 51 includes a substrate 55, and a combination of recording layer 56 and reflective layer 57, which are consecutively formed on the surface of the substrate 55 far from a light-incident side of the phase-change disk 50. The second disk section 53 includes a substrate 31, and a combination of reflective layer 59 and recording layer 60, which are consecutively formed on the surface of the substrate 58 near the light-incident side.

The recording layers 56, 60 are made of a material having a reversible phase-change property changing between a crystal phase and an amorphous phase, which have different optical transmission factors (referred to as simply transmission factors hereinafter). A laser beam 54 is irradiated onto the recording disk 50 so as to be focused in the vicinity of the recording layer 56 or 60, to obtain a reflected laser beam from the corresponding reflective layer 57 or 59. The reflected laser beam is examined for the optical intensity thereof to reproduce the data recorded on the recording layer 56 or 60.

In order for obtaining a sufficient optical intensity for the laser beam reflected from the second disk section 53 in the two-recording-layer phase-change disk 50, the first disk section 51 should have a higher transmission factor. This is because the optical beam reflected from the second disk section 53 passes twice through the first disk section 51. If the first disk section 51 has a transmission factor of T0 and the second disk section 53 has a reflectivity of R1, the reflected beam from the second disk section 53 has an optical intensity down to $T0^2 \times R1$ of the original optical intensity. Thus, it is desired that the first disk section 51 have a transmission factor of 50% or above for obtaining a practically sufficient optical intensity for the laser beam reflected from the second disk section 53.

In the conventional two-recording-layer phase-change disk 50, the reflective layer 57 in the first disk section 51 has a relatively small thickness to thereby suppress the reflection by the reflective layer 57. It may be considered to reduce the thickness of the recording layer 56 in the first disk section 51 in order to compensate a shortage of the transmission factor, instead of the smaller thickness of the reflective layer 57. However, the smaller thickness of the recording layer 56 in the phase-change disk 10 makes it difficult to crystallize the recording layer 56, thereby degrading the performance for forming and erasing a recorded mark on the recording layer 56.

Patent Publication JP-2004-310992A describes a technique for improving the transmission factor of the first disk section, wherein a single dielectric layer having a higher refractive index is provided on the surface of the reflective layer in the first disk section far from the light-incident side of the phase-change disk.

The technique described in the patent publication may improve the transmission factor of the first disk section by 2 to 10%, if the single dielectric layer has a refractive index of 2.0 or above. However, such an improvement is insufficient for the first disk section to have a transmission factor of 50% or above.

SUMMARY OF THE INVENTION

In view of the above problems in the conventional technique, it is an object of the present invention to provide an optical recording medium having a plurality of disk sections each including a recording layer, wherein one of the disk sections near the light-incident side of the optical recording medium has a relatively higher transmission factor, thereby allowing another of the disk sections far from the light-incident side to reflect a laser beam having a higher optical intensity.

The present invention provides an optical recording medium including a first recording layer, a transmission-factor control layer and a second recording layer which are consecutively disposed as viewed from a light-incident side of the optical recording medium, the transmission-factor control layer including a first reflective layer, a first dielectric layer having a refractive index of n1, a second dielectric layer having a refractive index of n2, and a third dielectric layer having a refractive index of n3, which are consecutively disposed as viewed from the light-incident side, wherein the following relationship hods:

$n1 > n2 < n3$.

The present invention also provides an optical recording medium including a first recording layer, a transmission-factor control layer and a second recording layer which are consecutively disposed as viewed from a light-incident side of the optical recording medium, the transmission-factor control layer including a first reflective layer and first through N-th dielectric layers, which are consecutively disposed as viewed from the light-incident side, given N being an odd number larger than three, the first through N-th dielectric layers having refractive indexes of n1 through $n_N$, respectively, wherein the following relationship hods:

$n1 > n2 < n3 \ldots > n_{N-1} < n_N$.

In accordance with the optical recording medium of the present invention, the transmission-factor control layer has a function of controlling the transmission factor of the layer group including the first recording layer due to the relationship between the refractive indexes, thereby allowing the light incident onto the second recording layer to have a higher optical intensity.

The above and other objects, features and advantages of the present invention will be more apparent from the following description, referring to the accompanying drawings.

PREFERRED EMBODIMENT OF THE INVENTION

Figure 1:
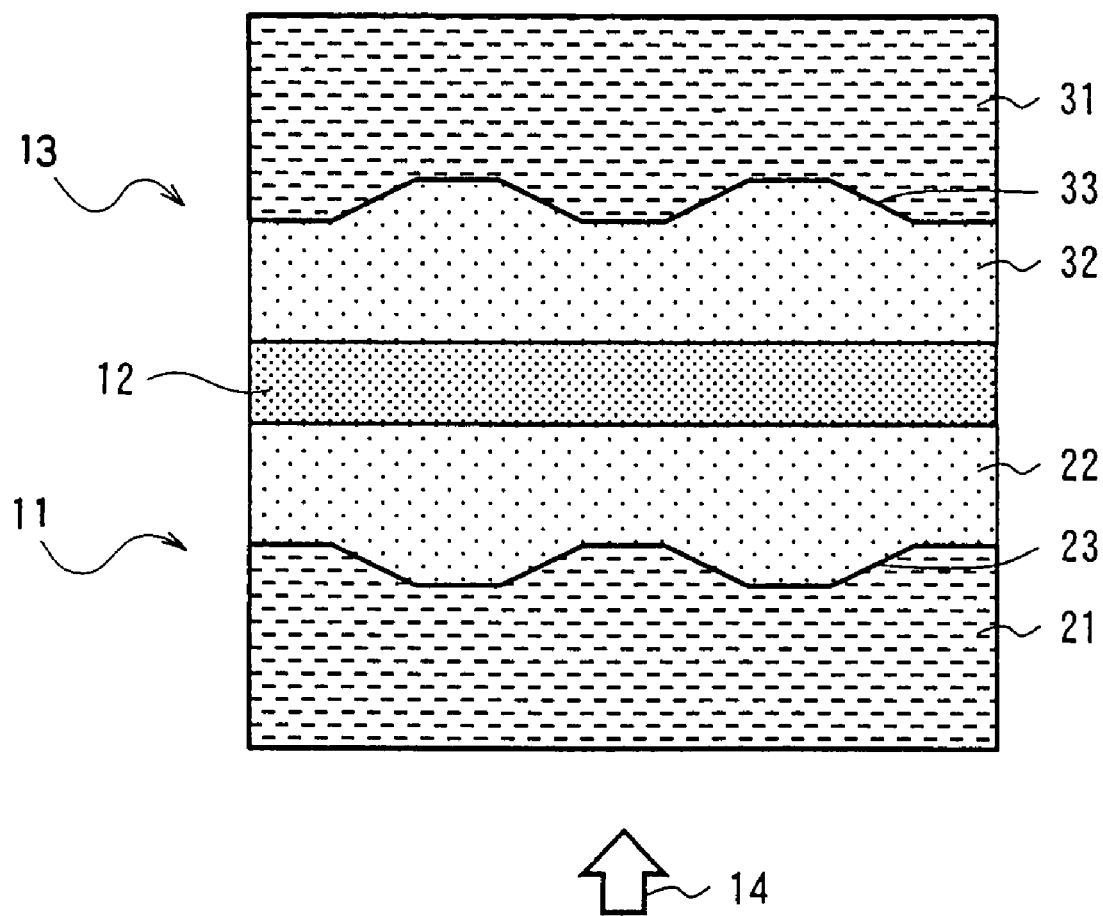
FIG. 1 is a sectional view of an optical recording medium according to an embodiment of the present invention.

Now, the present invention is more specifically described with reference to accompanying drawings, wherein similar constituent elements are designated by similar reference numerals throughout the drawings.

FIG. 1 is a sectional view of a two-recording-layer phase-change disk shown as an optical recording medium according to an embodiment of the present invention. The phase-change disk, generally designated by numeral 10, includes a first disk section 11, an optical separation layer 12 and a second disk section 13, which are consecutively disposed from the light-incident side of the phase-change disk 10 receiving a laser beam 14.

The first disk section 11 includes a transparent substrate 21 having a guide groove 23 on the surface thereof far from the light-incident side of the disk 10, and a first layer group 22 including a plurality of layers and formed on the surface of the substrate 21 on which the guide groove 23 is formed. The second disk section 13 includes a transparent substrate 31 having a guide groove 33 on the surface thereof near the light-incident side of the disk 10, and a second layer group 32 including a plurality of layers and formed on the surface of the substrate 31 on which the guide groove 33 is formed. The optical separation layer 12 is sandwiched between the first layer group 22 and the second layer group 32.

Both the substrates 21, 31 are made of a plastic material, such as polycarbonate, having a thickness of around 0.6 μm. In an alternative, the substrates 21, 31 may be made of glass. The optical separation layer 12 couples both the disk sections 11 and 13 together, while defining the distance therebetween. The optical separation layer 12 is made of a ultraviolet (UV)-ray-cured resin having a thickness of 25 μm, for example. The guide grooves 23, 33 have a depth of 30 nm and are arranged at a pitch of 0.4 μm.

Figure 2:
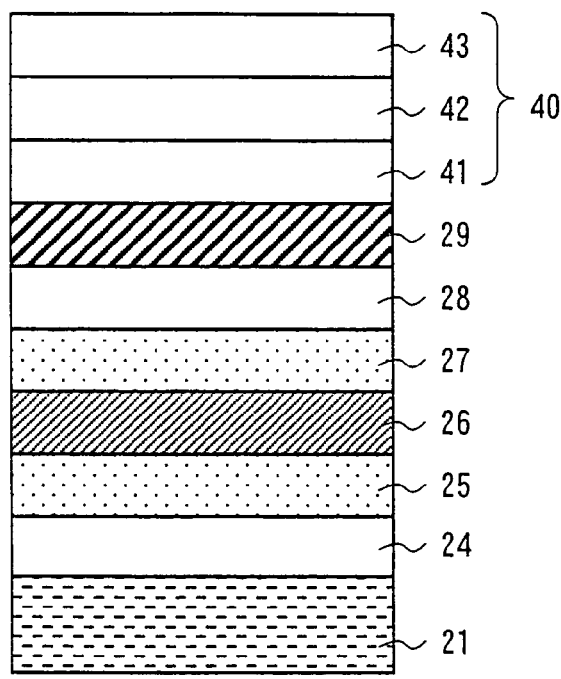
FIG. 2 is a schematic sectional view of the layer structure of the first disk section shown in FIG. 1.

FIG. 2 shows the layer structure of the first layer group 22 in the first disk section 11. The first layer group 22 includes a dielectric layer 24, a crystallization-assist layer 25, a recording layer 26, a crystallization-assist layer 27, a dielectric layer 28, a reflective layer 29 and a transmission-factor control film 40, which are consecutively formed on the surface of the substrate 21 far from the light-incident side of the phase-change disk 10. Recorded marks are formed along the grooves 23 (FIG. 1) in the recording layer 26.

Dielectric layers 24, 28 in the first disk section 11 may be made of a material selected from the group consisting of $ZnS-SiO_2$, $Ta_2O_5$, Si, and $SiO_2$. Dielectric layer 24 preferably has a thickness of 20 nm or above for suppressing the heat transferred to the substrate 21 and thus thermal deformation of the substrate 21. The thermal deformation of the substrate 21 degrades the iterative recording/reproducing characteristic of the phase-change disk 10. In the present embodiment, dielectric layer 24 is made of $ZnS-SiO_2$ having a thickness of 35 nm.

Dielectric layer 28 preferably has a thickness of 10 to 30 nm. A thickness smaller than 10 nm may degrade the film quality of dielectric layer 28, whereas a thickness larger than 30 nm may delay the thermal diffusion toward the adjacent reflective layer 29. In the present embodiment, dielectric layer 28 is made of $ZnS-SiO_2$ having a thickness of 15 nm.

The recording layer 26 of the first disk section 11 is preferably made of a material having a reversible phase-change property between the crystal phase and the amorphous phase by irradiating the recording layer with a laser beam having a specified optical intensity. Example of such a material include GeSbTe and AgInSbTe. The recording layer 26 preferably has a thickness of 7 nm or above. In the present embodiment, the recording layer 26 is made of GeSbTe having a thickness of 7 nm. The recording layer 26 stores data in the amorphous state thereof, and the data is erased by crystallizing the amorphous recording layer.

The reflective layer 29 of the first disk section 11 is preferably made of a metallic material such as Ag, Au, Cu, Al or Ti. The reflective film 29 preferably has a thickness of 5 to 15 nm. A thickness smaller than 5 nm degrades the thermal diffusion performance of the reflective layer 29, whereas a thickness larger than 15 nm reduces the transmission factor of the first disk section 11. In the present embodiment, the reflective layer 29 is made of Ag-based alloy having a thickness of 10 nm.

The reflective layer 29 made of Ag-based alloy may be replaced by a plurality of dielectric layers in the view point of the optical reflection function. However, the Ag-based reflective layer 29 is preferable because the reflective layer 29 should have a higher thermal radiation function for cooling the first disk section 11 to assist improvement of the iterative recording/reproducing characteristic of the first disk section 11.

The crystallization-assist layers 25, 27 are sandwiched between the recording layer 26 and dielectric layer 24 and between the recording layer 26 and dielectric layer 28, respectively, for assisting crystallization of the recording layer 26, i.e., erase of a recorded mark on the recording layer 26. The crystallization-assist layers 25, 27 are made of a nitride including Ge as a main component thereof, an oxide including Cr as a main component thereof, or a mixture thereof. The crystallization-assist layers 25, 27 preferably have a thickness of 3 to 7 nm in the view point of the film quality and crystallization-assisting function thereof. In the present embodiment, the crystallization-assist layers 25, 27 are made of GeCrN having a thickness of 5 nm. Variation of the thickness of the crystallization-assist layers 25, 27 scarcely affects the optical characteristic of the first disk section 11. The crystallization assisting layers 25, 27 may be omitted.

The transmission-factor control film 40 includes three dielectric layers 41, 42, 43, and improves the transmission factor of the first disk section 11. Assuming that dielectric layers 41, 42, 43 have refractive indexes of n1, n2, n3, respectively, these refractive indexes satisfy therebetween the following relationship;

$$n1 > n2 < n3 \qquad (1).$$

Dielectric layers 41, 43 are preferably made of a material selected from the group consisting of ZnS—SiO$_2$, TiO$_2$, SiN, Ta$_2$O$_5$, Nb$_2$O$_5$ and ZrO$_2$, whereas dielectric layer 42 is preferably made of a material selected from the group consisting of SiO$_2$, SiON and SiOC. Both dielectric layers 41, 43 may be made of the same material (n1=n3) or different materials (n1≠n3).

Dielectric layer 41 is preferably 10 to 30 nm thick. A thickness smaller than 10 nm may cause degradation of film quality, whereas a thickness larger than 30 nm may cause a lower thermal radiation rate. In the present embodiment, dielectric layers 41, 42, 43 are made of 30-nm-thick ZnS—SiO$_2$, 40-nm-thick SiO$_2$ and 50-nm-thick ZnS—SiO$_2$, respectively. The total thickness of the dielectric layers 41, 42, 43 is 120 nm in the present embodiment. The reflective layer 29 is indispensable for achieving improvement of the transmission factor of the first disk section 11 by using the transmission-factor control film 40. The reflective layer 29 that is made of a metallic material having a thickness of 5 nm or above assures such an improvement of the transmission factor.

Figure 3:
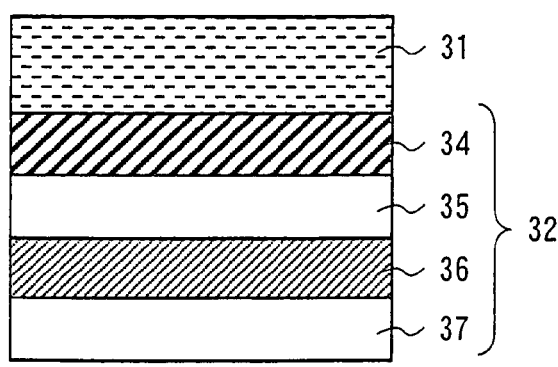
FIG. 3 is a schematic sectional view of the layer structure of the second disk section shown in FIG. 1.
Figure 4:
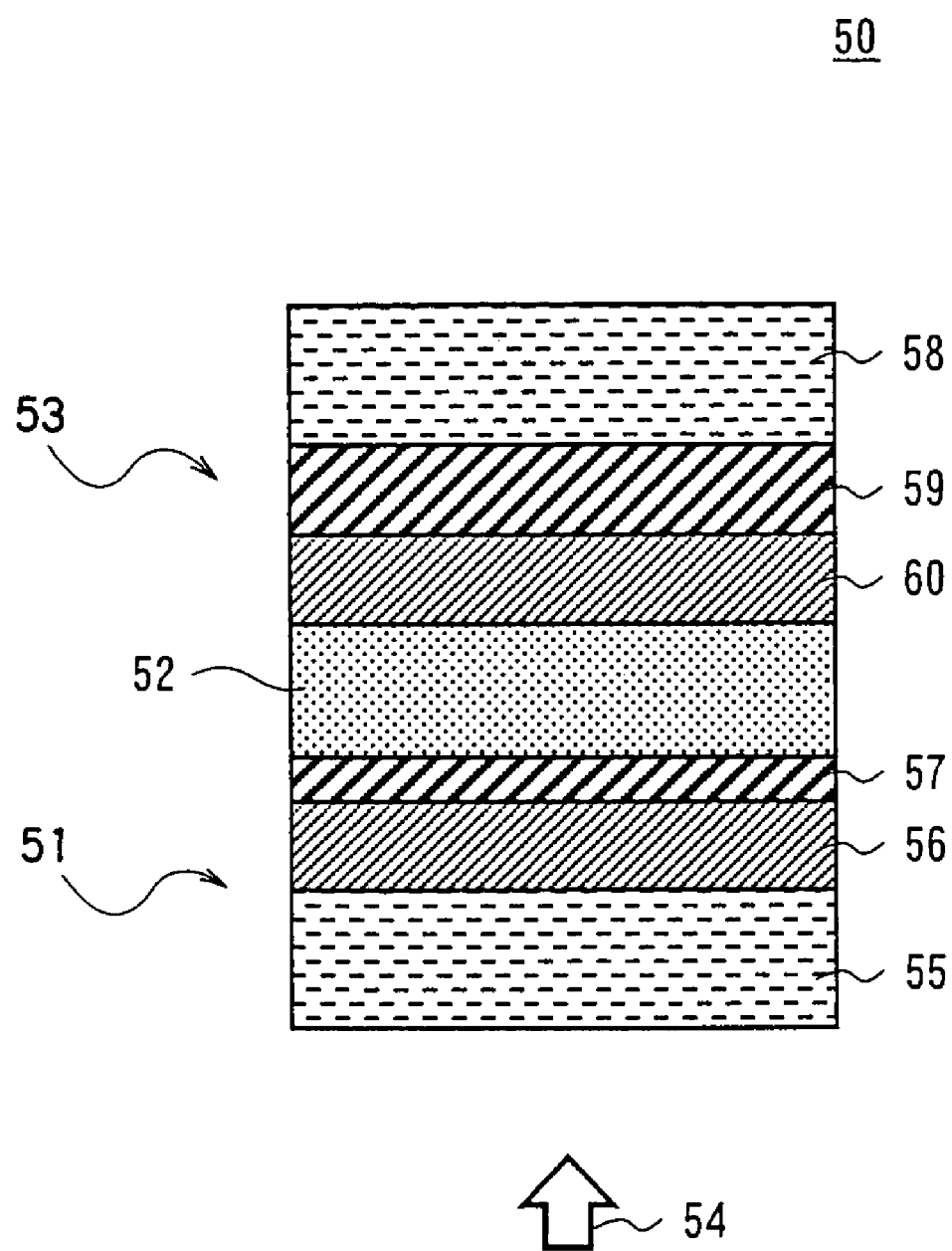
FIG. 4 is a schematic sectional view of the layer structure of a conventional optical recording medium.

FIG. 3 shows the layer structure of the second layer group 32 in the second disk section 13 shown in FIG. 1. The second layer group 32 includes a reflective layer 34, a dielectric layer 35, a recording layer 36 and a dielectric layer 37, which are consecutively deposited on the surface of the substrate 31 near the light-incident side of the phase-change disk 10. Recorded marks are formed along the grooves 33 (FIG. 1) in the recording layer 36.

In the present embodiment, the reflective layer 34 is made of 100-nm-thick metallic material such as Ag-based alloy, dielectric layer 35 is made of 15-nm-thick ZnS—SiO$_2$, the recording layer 36 is made of 15-nm-thick GeSbTe, and dielectric layer 37 is made of 50-nm-thick ZnS—SiO$_2$. The recording layer 36 stores data in the amorphous state thereof, and the data is erased by crystallizing the amorphous recording layer 36.

Table 1 shows the reflectivity and transmission factor of the respective materials used for the layers in the phase-change disk in the present embodiment. GeSbTe used for forming the recording layers 26, 36 is attached with the reflectivity and transmission factor in both the amorphous state (Amo.) and crystallized state (Cry.).

TABLE 1

| Material | Reflectivity(%) | Transmission Factor(%) |
| --- | --- | --- |
| ZnS—SiO$_2$ | 0.01 | 2.3 |
| GeCrN | 0.05 | 2 |
| SiO$_2$ | 0 | 1.54 |
| TiO$_2$ | 0.01 | 2.6 |
| Ag | 2 | 0.3 |
| GeSbTe (Cry.) | 2.5 | 2.5 |
| GeSbTe (Amo.) | 2.1 | 3.4 |

In manufacture of the phase-change disk 10 of the present embodiment, the first disk section 11 is formed by layering the first layer group 22 on the substrate 21, whereas the second disk section 13 is formed by layering the second layer group 32 on the substrate 31. Both the first and second layer groups 22, 32 are layered such that both the top layers thereof oppose each other with an intervention of UV-ray-cure resin. Irradiation of the resultant structure with a UV-ray cures the UV-ray-cure resin to form the optical separation layer 12, which isolates both the layer groups 22, 32 from each other.

The configuration in the present embodiment, wherein the first disk section 11 includes the transmission-factor control film 40 including three dielectric layers 41, 42, 43 having refractive indexes satisfying the relationship (1), effectively improves the transmission factor of the first disk section 11. This allows the recording layer 26 in the first disk section 11 to have a thickness of 7 nm or above while assuring the transmission factor of the first disk section 11 being equal to or above 50%. Thus, the first disk section 11 allows the reflected light from the second disk section 13 to have a practically sufficient optical intensity, while suppressing degradation of the erasing function of the recording layer 26 in the first disk section 11.

The configuration wherein the transmission-factor control film 40 has a thickness of 130 nm or below prevents peel-off of the transmission-factor control film 40 or the vicinity thereof, thereby assuring a stable data-storage capability of the first disk section 11. It is to be noted that an excessively higher transmission factor of the first disk section 11 reduces the reflectivity thereof, and thus a transmission factor of around 50% is preferable for the first disk section 11.

EXAMPLES

Example 1

For confirming the advantages of the above embodiment, an optical simulation was conducted wherein transmission factor of the first disk section 11 of Example 1 of the present embodiment was compared against that in comparative examples of the conventional phase-change disk. In this simulation, it was assumed that the first disk section in the conventional phase-change disk has a single dielectric layer instead of the transmission-factor control film 40 shown in FIG. 2. The comparative examples included a first comparative example wherein the single dielectric layer was made of ZnS—SiO$_2$ having a thickness of 25 nm, and a second comparative example wherein the single dielectric layer was made of TiO$_2$ having a thickness of 15 nm.

In the simulation, the reflectivity "R" and transmission factor "T" of the first disk section were calculated for those examples while the thickness of the constituent layers in the first disk section was varied in the examples. The reflectivity "R" included a first reflectivity "Rc" for the recording layer being in the crystallized state, and a second reflectivity "Ra" for the recording layer being in the amorphous state. The calculation for the reflectivity was conducted until the combination of the constituent layers provided a maximum transmission factor in the examples, and the combination of the thicknesses of the constituent layers providing the maximum transmission factor was identified. The calculation for the transmission factor was conducted for the recording layer 26 being in the crystallized state. The simulation used the matrix method, and assumed 405 nm for the wavelength of the laser beam.

In the simulation, restriction was assumed for the examples that the difference between the first reflectivity Rc and the second reflectivity Ra is around 4% in order for achieving a signal amplitude which allows identification of the crystallized state or the amorphous state, and that the first reflectivity Rc is around 7% in order for providing a stable servo function of the disk drive.

The range of allowable thicknesses was assumed 20 to 110 nm for dielectric layer 24, and 10 to 30 nm for dielectric layer 28. The thicknesses of the recording layer 26, reflective layer 29, and crystallization-assist layer 25 (27) were fixed at 7 nm, 10 nm and 5 nm. A thickness of dielectric layer 24 below 20 nm incurs an excessively higher thermal load to the substrate. The reason for the thickness of dielectric layer 24 being 110 nm or below is that examination of the dielectric layer 24 up to the 110 nm with the lower limit of 20 nm can cover the thickness range of dielectric layer 24 for a single optical period due to the refractive index of ZnS—$SiO_2$ being 2.3.

In Example 1, the thickness of each of the dielectric layers 41, 42, 43 in the transmission-factor control film 40 was set in the range between 20 nm and 60 nm. In comparative examples, the thickness of the single dielectric layer was set in the range between 10 nm and 100 nm, because this range can cover a single optical period due to the refractive indexes of the ZnS—$SiO_2$ and $TiO_2$ being 2.3 and 2.6, respectively. In this simulation, the reflectivity and transmission factor tabulated in Table 1 were used for respective layers.

The results of the simulation revealed that the maximum transmission factor T in the first and second comparative examples was around 46 to 48%, and the comparative examples did not achieve a transmission factor of 50% or above for any of the combinations of the thicknesses of the layers. On the other hand, Example 1 had a plurality of combinations that achieved a transmission factor of 50% or above. Table 2 exemplifies the combinations of thicknesses of the layers obtained in the simulation, whereas Table 3 shows reflectivity Rc and Ra and transmission factor (Trans. factor) T corresponding to the layers tabulated in Table 2.

TABLE 2

| Layer in group | Comp. Ex. 1 | Comp. Ex. 2 | Example 1 |
|---|---|---|---|
| Dielectric layer 43 | — | — | 50 |
| Dielectric layer 42 | — | — | 40 |
| Dielectric layer 41 | 25 | 15 | 30 |
| Reflective layer 29 | 10 | 10 | 10 |
| Dielectric layer 28 | 10 | 25 | 15 |
| Crystallization-assist layer 27 | 5 | 5 | 5 |
| Recording layer 26 | 7 | 7 | 7 |
| Crystallization-assist layer 25 | 5 | 5 | 5 |
| Dielectric layer 24 | 45 | 50 | 35 |

TABLE 3

| | Comp. Ex. 1 | Comp. Ex. 2 | Example 1 |
|---|---|---|---|
| Reflectivity Ra | 2.6 | 2.8 | 2.9 |
| Reflectivity Rc | 7.5 | 6.1 | 6.6 |
| Trans. Factor T | 45.6 | 47.8 | 51 |

Example 1 had a first disk section 11 achieving a transmission factor T which is about 10% higher than that in the comparative examples 1 and 2. This increases the signal intensity obtained from the second disk section 13 by about 20% in Example 1, thereby improving the quality of the signal reproduced from the second disk section 13. In other word, the recording power for recording data in the second disk section 13 can be reduced by about 20%.

In the comparative examples 1 and 2, a transmission factor of 50% or above was obtained in the first disk section only when the recording layer had a thickness of 6 nm or less. On the other hand, in Example 1, a transmission factor of 50% or above can be obtained in the first disk section 11 when the recording layer 26 had a thickness of 7 nm or above. It was further confirmed that a thickness for the reflective layer 29 which is reduced down to 8 nm further provides a transmission factor of 60% or above.

A phase-change disk of Example 1 was manufactured having a layer structure based on the thicknesses tabulated in Table 2. Data are recorded on the recording layers in the first and second disk sections of Example 1, and then reproduced therefrom to calculate the bit error rate thereof.

The recording/reproducing of the data was conduced under the conditions: a laser wavelength of 405 nm, a numerical aperture (NA) of 0.65, a recording density of 150 nm/bit, a clock frequency of 64.8 MHz, a 1-7 modulation scheme, and a linear speed of 6.6 m/sec. in the rotation of the disk. Table 4 shows the resultant bit error rate (BER), and additionally, the recording power and erasing power needed for recording/erasing the data.

TABLE 4

| | First disk section | Second disk section |
|---|---|---|
| Recording power | 7.5 mW | 11.8 mW |
| Erasing power | 3.1 mW | 5 mW |
| Bit error rate (BER) | $1.3 \times 10^{-5}$ | $6.0 \times 10^{-6}$ |

Table 4 reveals that a satisfactorily small bit error rate could be obtained from both the disk sections in Example 1, confirming an excellent recording/reproducing performance in the phase-change disk.

Examples 2-5

For confirming the advantages of the above embodiment, Examples 2-5 of the phase-change disk were manufactured, wherein the transmission-factor control film had a variety of thicknesses. Accelerated deterioration test was conduced for Examples 2-5, and data are recorded/reproduced from those samples to calculate bit error rate before and after the accelerated deterioration test. The thicknesses of the transmission-factor control film 40 in Examples 2-5 were 100 nm, 120 nm, 130 nm and 140 nm, respectively. The accelerated deterioration test was such that the samples were subjected to a temperature of 85 degrees C. and a humidity of 90% for a time length of 1,000 hours. The recording/reproducing conditions were similar to those used for Example 1. The results of bit error rate calculated before and after the accelerated deterioration test are shown in Table 5.

TABLE 5

| | Total thickness | BER before the test | BER after the test |
|---|---|---|---|
| Example 2 | 100 nm | $8.5 \times 10^{-6}$ | $9.2 \times 10^{-6}$ |
| Example 3 | 120 nm | $1.5 \times 10^{-5}$ | $1.3 \times 10^{-5}$ |
| Example 4 | 130 nm | $1.2 \times 10^{-5}$ | $2.1 \times 10^{-5}$ |
| Example 5 | 140 nm | $9.3 \times 10^{-6}$ | $1.3 \times 10^{-5}$ |

Table 5 reveals that Examples 4 and 5 having a total thickness of 130 nm or above for the transmission-factor control film 40 experienced a significant increase in the bit error rate after the accelerated deterioration test. This is considered due to the fact that a larger thickness of the transmission-factor control film 40 involves peel-off of the transmission-factor control film or the vicinity thereof due to an increased stress therein. Thus, the transmission-factor control film 40 preferably has a thickness of below 130 nm in order to suppress the increase with age in the bit error rate, thereby achieving a stable data-storage capability of the phase-change disk.

In the above embodiment, the transmission-factor control film 40 includes three dielectric layers. However, the transmission-factor control film may include any odd number of dielectric layers. For example, if the transmission-factor control film includes N dielectric layers (where N is an odd number larger than three), and first through N-th layers have refractive indexes of n1, n2, n3, ... $n_{N-1}$, $n_N$, then the refractive indexes of these dielectric layers should satisfy the following relationship:

$$n1 > n2 < n3 > n4 < \ldots > n_{N-1} < n_N,$$

for achieving a transmission-factor controlling function.

The phase-change disk of the above embodiment includes two recording layers 26, 36 or two disk sections 11, 13. However, the phase-change disk of the present invention may have three or more recording layers or disk sections. If the phase-change disk includes first through three recording sections, for example, the second disk section includes another transmission-factor control film which includes three or odd number of dielectric layers similarly to the transmission-factor control film 40 in the first disk section 11.

The first disk section may include the substrate at the side of the layer group far from the light-incident side of the phase-change disk. In such a case either, the transmission-factor control film should be disposed on the surface of the reflective layer far from the light-incident side of the phase-change disk for improving the transmission factor of the first disk section.

It is to be noted that the above embodiment is described for a phase-change disk; however, the configuration of the optical disk of the present invention can be applied to any of the other types of the optical disk.

Since the above embodiments are described only for examples, the present invention is not limited to the above embodiments and various modifications or alterations can be easily made therefrom by those skilled in the art without departing from the scope of the present invention.

What is claimed is:

1. An optical recording medium comprising a first recording layer, a first transmission-factor control layer, and a second recording layer which are consecutively disposed as viewed from a light-incident side of said optical recording medium,
    wherein said first transmission-factor control layer comprises a first reflective layer, a first dielectric layer having a refractive index of n1, a second dielectric layer having a refractive index of n2, and a third dielectric layer having a refractive index of n3, which are consecutively disposed as viewed from said light-incident side, and
    wherein n1>n2 and n2<n3.

2. The optical recording medium according to claim 1, further comprising a second transmission-factor control layer and a third recording layer consecutively succeeding said second recording layer as viewed from said light-incident side,
    wherein said second transmission-factor control layer comprises a second reflective layer, a fourth dielectric layer having a refractive index of n4, a fifth dielectric layer having a refractive index of n5 and a sixth dielectric layer having a refractive index of n6, which are consecutively disposed as viewed from said light-incident side, and
    wherein n4>n5 and n5<n6.

3. The optical recording medium according to claim 1, further comprising a second transmission-factor control layer and a third recording layer consecutively succeeding said second recording layer as viewed from said light-incident side,
    wherein said second transmission-factor control layer comprises a second reflective layer, and fourth to (3+M)-th dielectric layers which are consecutively disposed as viewed from said light-incident side, M being an odd number larger than three, said fourth to (3+M)-th dielectric layers having refractive indexes of n4 to $n_{3+M}$, respectively, and
    wherein the refractive index of each even-numbered dielectric layer within the second transmission-factor control layer is greater than the refractive index of each immediately adjacent odd-numbered dielectric layer within the second transmission-factor control layer.

4. The optical recording medium according to claim 1, wherein said first transmission-factor control layer has a thickness not greater than 130 nm.

5. The optical recording medium according to claim 2, wherein said second transmission-factor control layer has a thickness not greater than 130 nm.

6. The optical recording medium according to claim 3, wherein said second transmission-factor control layer has a thickness not greater than 130 nm.

7. The optical recording medium according to claim 1, wherein said first reflective film is a metallic film.

8. An optical recording medium comprising a first recording layer, a first transmission-factor control layer, and a second recording layer which are consecutively disposed as viewed from a light-incident side of said optical recording medium,
    wherein said first transmission-factor control layer comprises a first reflective layer and first through N-th dielectric layers, which are consecutively disposed as viewed from said light-incident side, N being an odd number larger than three, said first through N-th dielectric layers having refractive indexes of n1 through $n_N$, respectively, and
    wherein the refractive index of each odd-numbered dielectric layer within the first transmission-factor control layer is greater than the refractive index of each immediately adjacent even-numbered dielectric layer within the first transmission-factor control layer.

9. The optical recording medium according to claim 8, further comprising a second transmission-factor control layer and a third recording layer consecutively succeeding said second recording layer as viewed from said light-incident side,
    wherein said second transmission-factor control layer comprises a second reflective layer and (N+1)-th to (N+M)-th dielectric layers which are consecutively disposed as viewed from said light-incident side, M being an odd number equal to or larger than three, said (N+1)-th to (N+M)-th dielectric layers having refractive indexes of $n_{N+1}$ to $n_{N+M}$, respectively, and
    wherein the refractive index of each even-numbered dielectric layer within the second transmission-factor control layer is greater than the refractive index of each immediately adjacent odd-numbered dielectric layer within the second transmission-factor control layer.

* * * * *